(12) United States Patent  (10) Patent No.: US 8,971,931 B1
Wuellner et al.  (45) Date of Patent: Mar. 3, 2015

(54) SYSTEM AND METHOD FOR OPERATING AN ELECTRONIC DEVICE IN A LIMITED RADIO MODE

(71) Applicant: Google Inc., Mountain View, CA (US)

(72) Inventors: Trond Thomas Wuellner, Mountain View, CA (US); Joshua Woodward, Mountain View, CA (US); Alexander Friedrich Kuscher, San Francisco, CA (US); Ryan Tabone, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/651,347

(22) Filed: Oct. 12, 2012

(51) Int. Cl.
*H04W 24/00* (2009.01)

(52) U.S. Cl.
USPC .................. 455/456.4; 455/565; 455/456.1

(58) Field of Classification Search
CPC .................................................. H04W 48/04
USPC ............... 455/565, 418–421, 550.1, 404.2, 455/456.1–457; 340/539.13, 988–996; D10/104.2
See application file for complete search history.

(56) References Cited

U.S. PATENT DOCUMENTS

| 2002/0017989 | A1 | 2/2002 | Forster et al. | |
| 2005/0246412 | A1* | 11/2005 | Murrell et al. | 709/200 |
| 2006/0170650 | A1* | 8/2006 | Madrange | 345/156 |
| 2007/0019601 | A1* | 1/2007 | Kim et al. | 370/342 |
| 2007/0032225 | A1* | 2/2007 | Konicek et al. | 455/417 |
| 2009/0117919 | A1 | 5/2009 | Hershenson | |
| 2009/0239508 | A1* | 9/2009 | Waddell | 455/414.1 |
| 2010/0056181 | A1* | 3/2010 | Rippon et al. | 455/456.3 |
| 2011/0021213 | A1* | 1/2011 | Carr | 455/456.4 |
| 2012/0076045 | A1* | 3/2012 | Pease et al. | 370/254 |
| 2012/0077457 | A1* | 3/2012 | Howarter et al. | 455/404.2 |
| 2012/0196639 | A1* | 8/2012 | Takeda | 455/515 |

* cited by examiner

*Primary Examiner* — Ronald Eisner
(74) *Attorney, Agent, or Firm* — Troutman Sanders LLP; James E. Schutz; Jay R. Anderson

(57) ABSTRACT

A system and method for operating an electronic device in a limited radio mode are provided. The system determines a location of an electronic device. The system also identifies one or more components of the electronic device enabled to provide radio data communication services. The system, for each of the identified one or more components, determines if a respective radio data communication service provided by the component is an authorized service at a determined location of the electronic device and selectively disables the component if the respective data communication service is not an authorized service.

23 Claims, 4 Drawing Sheets

SYSTEM AND METHOD FOR OPERATING AN ELECTRONIC DEVICE IN A LIMITED RADIO MODE

BACKGROUND

Regulatory agencies such as the United States Federal Aviation Administration (FAA) restrict the use of certain radio data communication services on an aircraft during its operation. However, certain radio data communication services have been authorized by regulatory agencies and may be used in such contexts. Furthermore, regulatory agencies have not uniformly agreed on which radio data communication services may be authorized on an aircraft during its operation and which radio data communication services are prohibited.

SUMMARY

According to one aspect of the subject technology, a method of operating an electronic device in a limited radio mode is provided. The method comprises determining a location of an electronic device. The method further comprises identifying one or more components of the electronic device enabled to provide radio data communication services. For each of the identified one or more components, the method further comprises determining if a respective radio data communication service provided by the component is an authorized service at the determined location of the electronic device and selectively disabling the component if the respective radio data communication service provided by the component is not an authorized service.

According to another aspect of the subject technology, a system for operating an electronic device in a limited radio mode is provided. The system comprises one or more processors, and a machine-readable storage medium comprising instructions stored therein, which when executed by the processors, cause the processors to perform operations comprising receiving an indication for an electronic device to operate in a limited radio mode. The operations further comprise identifying one or more components of the electronic device enabled to provide radio data communication services. For each of the identified one or more components, the system further comprises in response to the indication, searching for an active access point associated with a radio data communication service, determining if the respective radio data communication service provided by the component is an authorized service at a location of the electronic device, wherein the respective radio data communication service is determined to be authorized if an active access point associated with the radio data communication service is found, and selectively disabling the component if the respective radio data communication service provided by the component is not an authorized service.

According to another aspect of the subject technology, a machine readable medium for operating an electronic device in a limited radio mode is provided. The machine readable medium comprising instructions stored therein, which when executed by a processor, cause the processor to perform operations comprising receiving an indication for an electronic device to operate in a limited radio mode. The operations further comprise identifying one or more components of the electronic device enabled to provide radio data communication services. For each of the identified one or more components, the operations further comprise in response to the indication, searching for an active access point associated with a radio data communication service, determining if the respective radio data communication service provided by the component is an authorized service at a location of the electronic device, wherein the respective radio data communication service is determined to be authorized if an active access point associated with the respective radio data communication service is found, selectively disabling the component if the respective radio data communication service provided by the component is not an authorized service, and providing, for display on the electronic device, a listing of authorized radio data communication services and one or more user selectable controls configured to disable the one or more components enabled to provide the authorized radio data communication services.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are by way of example and explanation and are intended to provide further explanation of the subject technology as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology. In the drawings.

DETAILED DESCRIPTION

Figure 1:
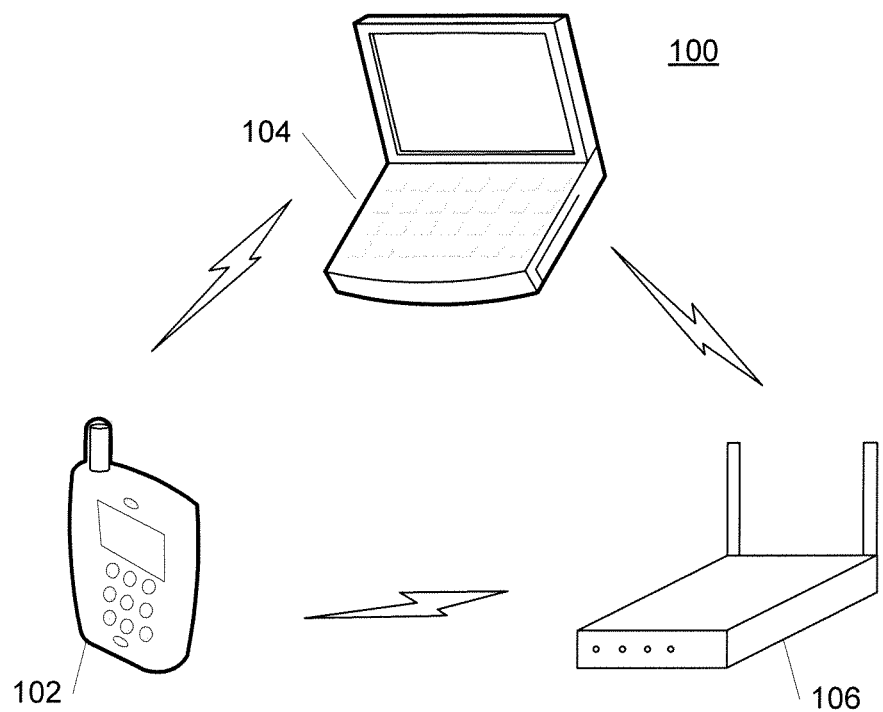
FIG. 1 illustrates an example distributed network environment for operating an electronic device in a limited radio mode.

The detailed description set forth below is intended as a description of various configurations of the subject technology and is not intended to represent the only configurations in which the subject technology may be practiced. It will be apparent, however, that the subject technology is not limited to the specific details set forth herein and may be practiced without these specific details. In some instances, structures and components are shown in block diagram form in order to avoid obscuring the concepts of the subject technology.

In accordance with the subject disclosure, a system and method for operating an electronic device in a limited radio mode are provided. A limited radio mode is an operating mode which limits the use of radio communication services. Limited radio mode includes airplane mode, in-flight mode, and other radio modes which limit use of radio communication services. The electronic device may be any electronic device with hardware components for providing radio data communication services. For example, the electronic device may be a laptop computer, a smartphone, a PDA, a tablet computer, a desktop computer etc. Example radio data communication services include WiFi, Bluetooth, mobile broadband, etc.

The system receives an indication for the electronic device to operate in limited radio mode. The indication for the electronic device to operate in limited radio mode may be generated in response to a user action with respect to a user selectable control (e.g., a hardware switch to enter into limited radio mode, a software user interface switch to enter into limited radio mode, etc). The indication may also be transmitted by a device (e.g., a router, an access point, etc.) that regulates radio data communication services. In one example, the indication is a known WiFi service set identifier that is transmitted from an access point onboard an airplane. The system receives the WiFi service set identifier when the electronic device is within a proximity of the airplane. The indication may also be based on the location of the electronic device. In another example, the indication is generated when the electronic device is operating in a location that requires the electronic device to operate in limited radio mode. Geolocation services may be utilized to determine the electronic device's current location (e.g., via satellite triangulation, cellsite triangulation, etc) and to compare the electronic device's current location with known locations where the electronic device is required to operate in limited radio mode.

The indication may also be generated based on a combination of the options described above. In one example, the system determines locations where the electronic device may be required to operate in a limited radio mode. Once the electronic device is determined to be located at a location that may require the electronic device to operate in safe limited radio mode, the system searches for an identifier for a known in-flight service provider. If the system receives an identifier for a known in-flight service provider while the electronic device is operating at a location that requires the electronic device to operate in limited radio mode, an indication to operate in limited radio mode is generated.

Upon receipt of the indication, the system identifies components of the electronic device that are enabled to provide radio data communication services. For each of the identified components, the system determines if the radio data communication service provided by the component is an authorized service. This determination may be made by searching for an active access point associated with the radio data communication service, where the radio data communication service is determined to be authorized if an access point associated with the radio data communication service is found. The electronic device may communicate with the active access point using a set of approved frequency bands (e.g., 2.4 GHz, 5 GHz, etc.) which may be further subdivided into channels (e.g., channels 1-11). The electronic device may scan each channel of the set of approved frequencies for an known service set identifier for an authorized radio data communication service, a known media access control address, or regulatory domain settings.

For each of the identified components, the system determines whether the electronic device has received a service set identifier from the active access point. When the electronic device received an authorized service set identifier for the radio data communication service, the system maintains the enabled status of the component that provides the radio data communication service and proceeds to check if any other identified components provide an authorized radio data communication service. If the electronic device did not receive a service set identifier, then the system determines whether the electronic device received a media access control address from the active access point. If the electronic device received an authorized media access control address for the radio data communication service, the system maintains the enabled status of the component that provides the radio data communication service and proceeds to check if any other identified components provide an authorized radio data communication service. If the electronic device did not receive a media access control address, the system checks if the electronic device has received regulatory domain settings.

When the electronic device received regulatory domain settings, the system determines whether the received regulatory domain settings prohibit the radio data communication service. If the regulatory domain settings do not prohibit the radio data communication service, then the radio data communication that is provided by the component is determined to be an authorized radio data communication service, the component that provides the radio data service is allowed to remain enabled, and the system proceeds to check if any other identified components provide an authorized radio data communication service. However, if the regulatory domain settings prohibit the radio communication service, the system disables the component that provides the unauthorized radio data communication service and proceeds to check if any other identified components provide an authorized radio data communication service.

The system may also determine if a component provides an authorized data communication service by checking if the active access point provides an authorized service set identifier, an authorized media access control address, and regulatory domain settings that prohibit the radio data communication service provided by the component in any order. Alternatively, the system may determine whether a component provides an authorized radio data communication service by individually determining if the active access point provides an authorized service set identifier, or if the active access point provides an authorized media access control address or if the active access point provides regulatory domain settings that prohibit the radio data communication service provided by the component. For example, the system may determine whether a component provides an authorized radio data communication service by determining whether the active access point provides an authorized service set identifier for the radio data communication service provided by the component and proceed to check if any other identified components provide an authorized radio data communication service without checking if the active access point also provides an authorized media access control address or provides regulatory domain settings that prohibit radio data communication service provided by the component.

The system may partially disable a component (e.g., prohibit the component from transmitting signals but allow the component to receive signals) in response to determining that the component provides an unauthorized radio data communication service. Alternatively the system may fully disable the component (e.g., power off the component). The system may choose to partially or fully disable a component based on whether the electronic device is connected to a power source. When the electronic device is connected to a power source and the system determines that a component of the electronic device provides an unauthorized radio data communication service, the system may elect to disable to the component's one or more signal transmitters but continue to provide power to the component's one or more signal receivers. When the electronic device is not connected to a power source (e.g., drawing power from a battery source), and the system determines that a component of the electronic device provides an unauthorized radio data communication service, the system may power off the component to conserve power.

A user interface containing information about the one or more radio data communication services may be provided. For example, the user interface may provide a listing of authorized radio data communication services. The user interface may also provide one or more user selectable controls configured to disable the one or more components enabled to provide the authorized radio data communication services. In a case where the electronic device disables all components that are enabled to provide radio data communication services in response to receiving an indication that the electronic device is being set to operate in a limited radio mode, the user interface may provide a user selectable control (e.g., a button, a switch, etc.) that is configured to disable all of the components that provide radio data communication services, enable all of the components that provide radio data communication services, or enable only the component that provides WiFi.

FIG. 1 illustrates an example network environment for operating an electronic device in a limited radio mode. A network environment 100 includes a number of electronic devices 102, and 104, and access point 106. Access point 106 may be any system or device having communications capabilities to relay data between electronic devices 102, and 104 and one or more networks. Access point 106 may be a single device, or may include multiple access points that are configured to relay data between electronic devices 102, and 104 and the one or more networks.

The one or more networks may include any one or more of a cellular network, a satellite network, a personal area network (PAN), a local area network (LAN), a wide area network (WAN), a broadband network (BBN), the Internet, and the like. Further, the one or more networks can include, but is not limited to, any one or more of the following network topologies, including a bus network, a star network, a ring network, a mesh network, a star-bus network, tree or hierarchical network, and the like.

Electronic devices 102, and 104 may be tablet computers, PDAs, portable media players, desktop computers, or other computing devices. In the example of FIG. 1, electronic device 102 is depicted as a smartphone device, and electronic device 104 is depicted as a laptop computer. In some example aspects, each of the electronic devices 102, and 104 may be any machine with components (e.g., hardware components) to provide one or more radio communication services. Example radio communication services include WiFi, Bluetooth, mobile broadband, etc.

Electronic device 102 or 104 determines a location of the electronic device. The electronic device also identifies one or more of its hardware components that are enabled to provide radio data communication services. The electronic device may generate a listing of the identified components. According to another example aspect, electronic device 102, or 104 receives an indication that the electronic device is set to operate in a limited radio mode. This indication may be user designated. Furthermore, this indication may also be transmitted from another device. The electronic device, upon receipt of the indication to enter into limited radio mode, identifies one or more of its hardware components that are enabled to provide radio data communication services. The electronic device may generate a listing of the identified components.

For each of the identified one or more components, the electronic device determines if a respective radio data communication provided by the component is an authorized service at a location of the electronic device. The electronic device may determine if the radio data communication service is authorized by searching for an active access point associated with the radio data communication service, where the radio data communication service is determined to be authorized if an active access point associated with the radio data communication service is found.

The electronic device may receive a service set identifier from the active identifier. The electronic device may compare the received service set identifier against a set of authorized service set identifiers. The electronic device may determine the radio data communication service to be authorized if the received service set identifier matches one of the set of authorized service set identifiers. The electronic device may also receive a media access control address from the active access point. The electronic device may compare the received media access control address against a set of authorized media access control addresses. The electronic device may determine the radio data communication service to be authorized if the received media access control address matches one of the set of authorized media access control addresses.

The electronic device may also receive regulatory domain settings from the active access point. The electronic device may determine whether the received regulatory domain settings prohibit the radio data communication service, where the radio data communication is determined to be authorized if the radio data communication service is not prohibited by the regulatory domain settings. When the electronic device does not receive an authorized service set identifier or an authorized media access control address for the radio data communication service, and the received regulatory domain settings do not authorize the radio data communication service, the radio data communication service is considered as an unauthorized radio data communication service. The electronic device then selectively disables the component that provides the unauthorized radio data communication service.

When one or more of the identified components are enabled to receive radio signals associated with radio data communication services and disabled to transmit radio signals associated with radio data communication services, the electronic device may also enable the component to transmit radio signals if it is determined that the radio data communication service provided by the component is an authorized service. The electronic device may provide a user interface containing a listing of authorized radio data communication services for display to the user. The user interface may also include one or more user selectable controls configured to disable the one or more components enabled to provide the authorized radio data communication services.

Figure 2:
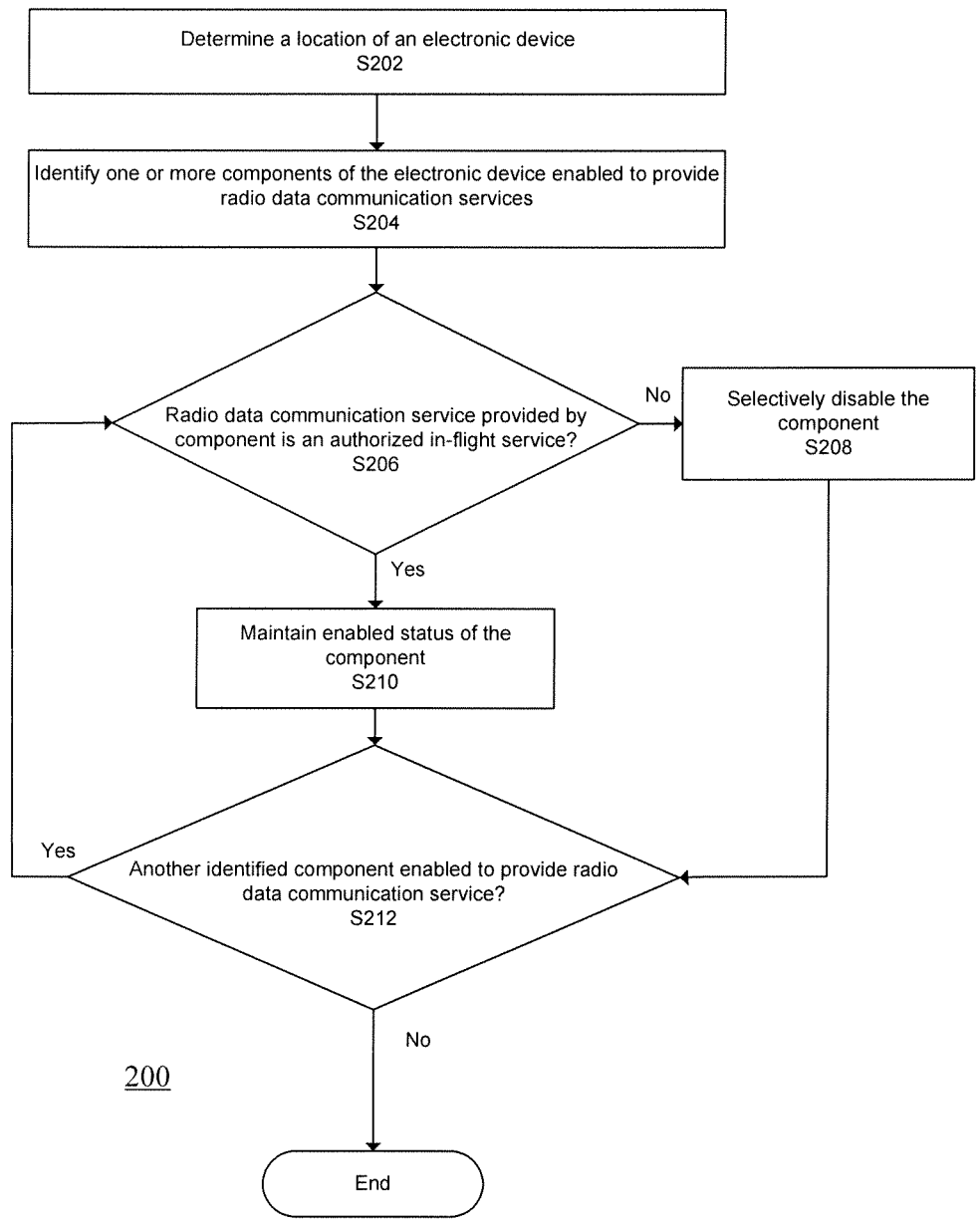
FIG. 2 illustrates an example process for operating an electronic device in a limited radio mode.

FIG. 2 illustrates an example process for operating an electronic device in a limited radio mode. A geographical location of an electronic device is determined in step 202. The electronic device may use geolocation services (e.g., satellite triangulation, cellsite triangulation, etc.) to determine its geographical location. In one example, the geographical location of the electronic device may be determined based on signals transmitted from a satellite navigation system and/or signals transmitted from base stations. In another example, the electronic device may receive an identifier for a service provider (e.g. an approved WiFi service set identifier), where the geographical location of the electronic device may be determined based on the service provider. The electronic device may also determine its geographical location based on a proximity to the service provider. For example, the electronic device may determine its proximity to the service provider based on signal strength of received signals from the service provider.

According to another example aspect, the electronic device receives an indication for the electronic device to operate in a limited radio mode. The indication may be generated by a user action. In one example, the electronic device provides a user interface, where the user interface provides a user selectable control configured to cause electronic device to enter into limited radio mode in response to a user action (e.g., a swipe action, a tap action, a hover action, etc.). The indication may also be a signal that is transmitted from a device (e.g., a router, an access point, etc.) that is associated with the radio data communication service to notify the electronic device that it should enter into limited radio mode.

In another example, the electronic device determines whether it is operating at a location that requires the electronic device to operate in a limited radio mode. Locations such as airports may be designated as locations that require the electronic device to operate in a limited radio mode. The electronic device may determine whether the electronic device is located at a location that requires the electronic device to operate in a limited radio mode, and an indication to operate in limited radio mode is received if the electronic device is operating at one of the designated locations. In a further example, the electronic device scans for an identifier for known in-flight service providers, and an indication to operate an in limited radio mode is received if the electronic device obtains the identifier for the known in-flight service set identifier. In a further example, an indication to operate in a limited radio mode is received if the electronic device obtains an identifier for a known in-flight service provider while the electronic device is operating at a location that requires the electronic device to operate in a limited radio mode.

In step 204, the electronic device identifies one or more components of the electronic device that are enabled to provide radio data communication services. Radio data communication services may include WiFi, Bluetooth, mobile broadband, etc. The one or more components of the electronic device may include antennas, chipsets and other components for providing WiFi, Bluetooth, mobile broadband, etc.

In step 206, the electronic device determines if a radio data communication service provided by a component is an authorized service at a location of the electronic device. In one example, the radio data communication service is determined to be an authorized service if the location of the electronic device is within a proximity of a public transportation vehicle (e.g., an airplane). The electronic device may also determine if the radio data communication service is authorized by searching for an active access point associated with the radio data communication service. The radio data communication service is determined to be authorized if an active access point associated with the radio data communication service is found.

For each of the identified one or more components, the electronic device may receive a service set identifier from the active access point and compare the received service set identifier against a set of authorized service set identifiers, where the radio data communication service is determined to be authorized if the received service set identifier matches one of the set of authorized service set identifiers. Furthermore, the electronic device may receive a media access control address from the active access point and compare the received media access control address against a set of authorized media access control addresses, where the radio data communication is determined to be authorized if the received media access control address matches one of the set of authorized media access control addresses. The electronic device may also receive regulatory domain settings from the active access point and determine whether the regulatory domain settings prohibit the radio data communication service, where the radio data communication is determined to be authorized if the regulatory domain settings authorize the radio data communication service provided by the component. In one example, regulatory domain settings are designated by an aviation governing authority (e.g., the Federal Aviation Administration, the Transportation Security Administration, etc.).

For example, when the electronic device has identified components that are enabled to provide WiFi, Bluetooth, and mobile broadband, the electronic device may determine if the electronic device has received a authorized service set identifier for WiFi from the active access point. The electronic device maintains the enabled status of the component that provides WiFi in step 210 if the received service set identifier matches one of the set of authorized service set identifiers for WiFi, and proceeds to check if any other identified component (e.g., component for Bluetooth or component for mobile broadband) is enabled to provide radio data communication services in step 212. If the electronic device did not receive a service set identifier, then the electronic device determines whether the electronic device received a media access control address from the active access point.

If the electronic device received a media access control address from the active access point, the electronic device determines if the received media access control address is an authorized media access control address for WiFi. The electronic device maintains the enabled status of the component that provides WiFi in step 210 if the received media access control address is an authorized media access control address for WiFi, and proceeds to check if any other identified component (e.g., component for Bluetooth or component for mobile broadband) is enabled to provide radio data communication services in step 212. If the electronic device did not receive a media access control address, the electronic device determines if it has received regulatory domain settings from the active access point.

If the electronic device received regulatory domain settings from the active access point, the electronic device determines whether the received regulatory domain settings prohibit use of WiFi. The electronic device maintains the enabled status of the component that provides WiFi in step 210 if the regulatory domain settings allow the use of WiFi, and proceeds to check if any other identified component (e.g., component for Bluetooth or component for mobile broadband) is enabled to provide radio data communication services in step 212. However, if the regulatory domain settings do not allow the use of WiFi, the electronic device disables the component that provides WiFi in 208 and checks if any other identified component (e.g., component for Bluetooth or component for mobile broadband) is enabled to provide radio data communication services in step 212.

The electronic device may receive an indication for the electronic device to operate in a limited radio mode, where the steps of determining if a respective data communication service provided by the component is an authorized service and selectively disabling the component if the respective data communication service is not an authorized service are performed in response to receiving the indication. Furthermore, the indication for the electronic device to operate in the limited radio mode may be generated by a user interaction with the user selectable control that is configured to trigger the electronic device to operate in the limited radio mode.

At step 212, if the electronic device identifies another component that is enabled to provide radio data communication service, the electronic device repeats step 206 to determine if radio data communication service provided by the component is authorized. When no other identified component is enabled, or all of enabled components have been determined to be authorized, the process ends.

Alternatively, the electronic device may also determine whether a component provides an authorized data communication service by checking if the active access point provides an authorized service set identifier, an authorized media access control address, and regulatory domain settings that prohibit the radio data communication service provided by the component in any order. Furthermore, the electronic device may conclude that a component provides an unauthorized radio data communication service if the electronic device did not receive an authorized service set identifier from the active access point, or if the electronic device did not receive an authorized machine access control address from the active access point, or if regulatory domain settings provided by the active access point prohibit the radio data communication service provided by the component. One or more of the identified components may be enabled to receive radio signals associated with the radio data communication services and disabled to transmit radio signals associated with radio data communication services. In this case, the one of more identified components may be enabled to transmit radio signals if it is determined that the radio data communication service provided by the component is an authorized service.

The electronic device selectively disables the component if it is determined that the radio data communication service provided by the component is not an authorized service in step 208. The electronic device may partially disable the component, e.g., disable the component's transmitter to prevent the component from transmitting signals for the unauthorized radio data communication service but maintaining the component's receiver to receive signals, including signals that contain an authorization to enable the unauthorized radio data communication service. The electronic device may also power off the device completely until it receives an indication that the radio data communication service provided by the component is no longer unauthorized.

The electronic device may determine whether to partially disable the component (e.g., by turning off the component's transmitter) or to power off the component based on whether the electronic device is connected to a power source. When the electronic device is connected to a power source that provides it with power, the electronic device may disable the component's transmitter to prevent the component from transmitting signals for the unauthorized radio data communication service but maintaining the component's receiver to receive signals upon determining that the component provides a radio data communication service that is unauthorized. Alternatively, where the electronic device is using power from a battery and the electronic device is not connected to a power source, the electronic device may elect to power off the component upon determining that the component provides a radio data communication service that is unauthorized.

The electronic device then checks if any other identified component is enabled to provide radio data communication service in step 212. If the electronic device identifies another component that is enabled to provide radio data communication service, the electronic device repeats step 206 to determine if radio data communication service provided by the component is authorized. When no other identified component is enabled, or all of enabled components have been determined to be authorized, the process ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 3:
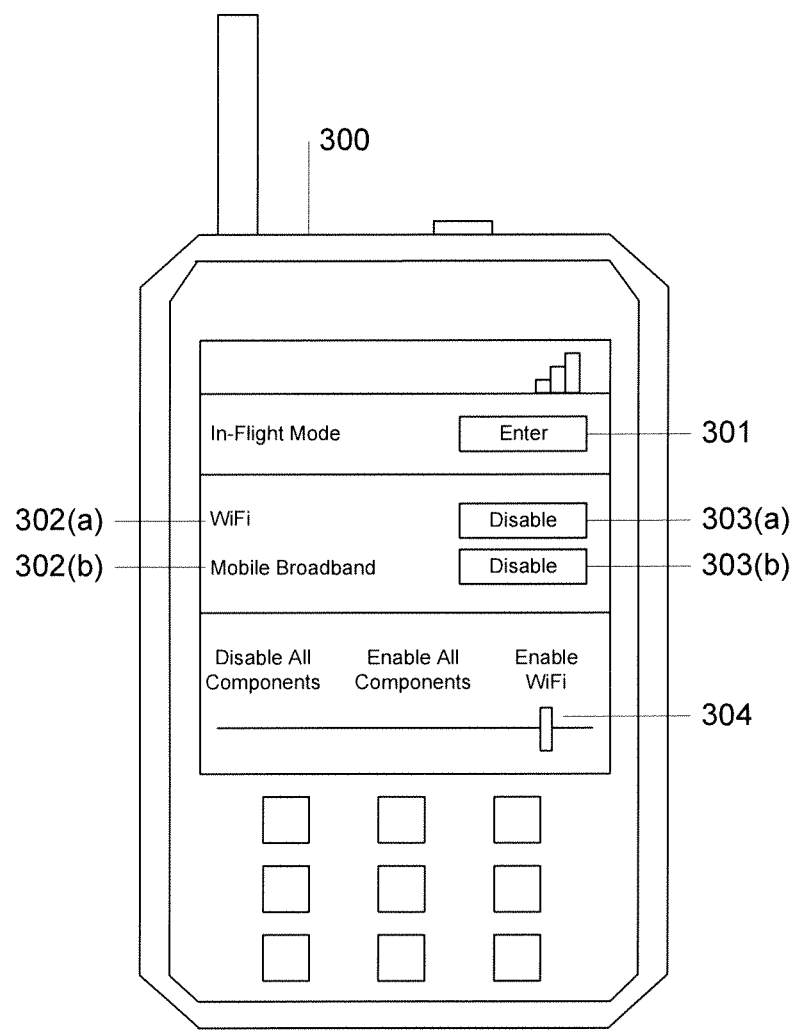
FIG. 3 illustrates an example user interface for managing an electronic device to operate in a limited radio mode on a smartphone device.

FIG. 3 illustrates an example user interface for managing an electronic device to operate in a limited radio mode on a smartphone device 300. While FIG. 3 depicts a smartphone device, additional electronic devices, such as laptop computers, tablet computers, PDAs, etc., may also provide a user interface for managing the respective electronic device to operate in a limited radio mode. The user interface as shown in FIG. 3 contains a user selectable control 301 configured to trigger a user indication that the smartphone device has entered or is about to enter into a limited radio mode. The user selectable control as shown in FIG. 3 is a button that responds to a user tap action with respect to an area of the smartphone's screen that displays the button 301. Additional user selectable controls (e.g., a switch, a toggle, etc.) may also be configured to trigger a user indication that the electronic device has entered into a limited radio mode in response to a user action (e.g., a slide action, a hover action, a click action, etc.).

The user interface as shown in FIG. 3 contains a listing of authorized radio data communication services 302(*a*) and 302(*b*) and user selectable controls 303(*a*) and 303(*b*) configured to disable the authorized radio data communication services. The authorized radio data communication service as shown in FIG. 3 are WiFi 302(*a*) and mobile broadband 302(*b*). The listing of authorized data communication services may be dynamically updated to include additional radio data communication services that have been determined to be authorized radio data communication services (e.g., Bluetooth) or remove one or more radio data communication services that have been determined by the electronic device as unauthorized radio data communication services (e.g., mobile broadband). The interface also includes user selectable controls 303(a) and 303(b) that are configured to disable WiFi 302(a) and mobile broadband 302(b). The user selectable controls 303(a) and 303(b) as shown in FIG. 3 are buttons that configured to separately disable WiFi 302(a) and mobile broadband 302(b) in response to separate user tap actions with respect to the respective buttons. Additional user selectable controls (e.g., a switch, a toggle, etc.) may also be configured to disable a corresponding radio data communication service in response to a user action (e.g., a slide action, a hover action, a click action, etc.).

Alternatively, the user interface may provide a listing of all of the radio data communication services that are provided by the electronic device including one or more radio data communication services that have been determined to be unauthorized radio data communication services. The user interface may provide one or more user selectable controls, each of which corresponds to a separate radio data communication service. The one or more user selectable controls may each be configured to enable or disable the component that provides the corresponding radio data communication service in response to a user action (e.g., a tap action, a swipe action, a hover action, a click action, etc.) with respect to the respective user selectable control. When the user attempts to enable a component that has been determined to provide an unauthorized radio data communication service, the electronic device may provide a notification that the radio data communication service is unauthorized, and a subsequent user action to enable the unauthorized service causes the electronic device to exit from limited radio mode.

The user interface shown in FIG. 3 contains a three-way switch 304 that allows the user to disable all components that provide radio data communication services, enable all components that provide radio data communication services or enable the component that provides WiFi only. When the user selects to enable all of the components that provide radio data communication services, or to enable the component that provides Wifi, and the electronic has determined that one or more components provide one or more unauthorized radio data communication services, the electronic device may notify the user that one or more of the components that the user has selected to enable provide one or more unauthorized radio data communication services. When the user is persistent on enabling one or more components that provide one or more unauthorized services, the electronic device may exit from limited radio mode.

Figure 4:
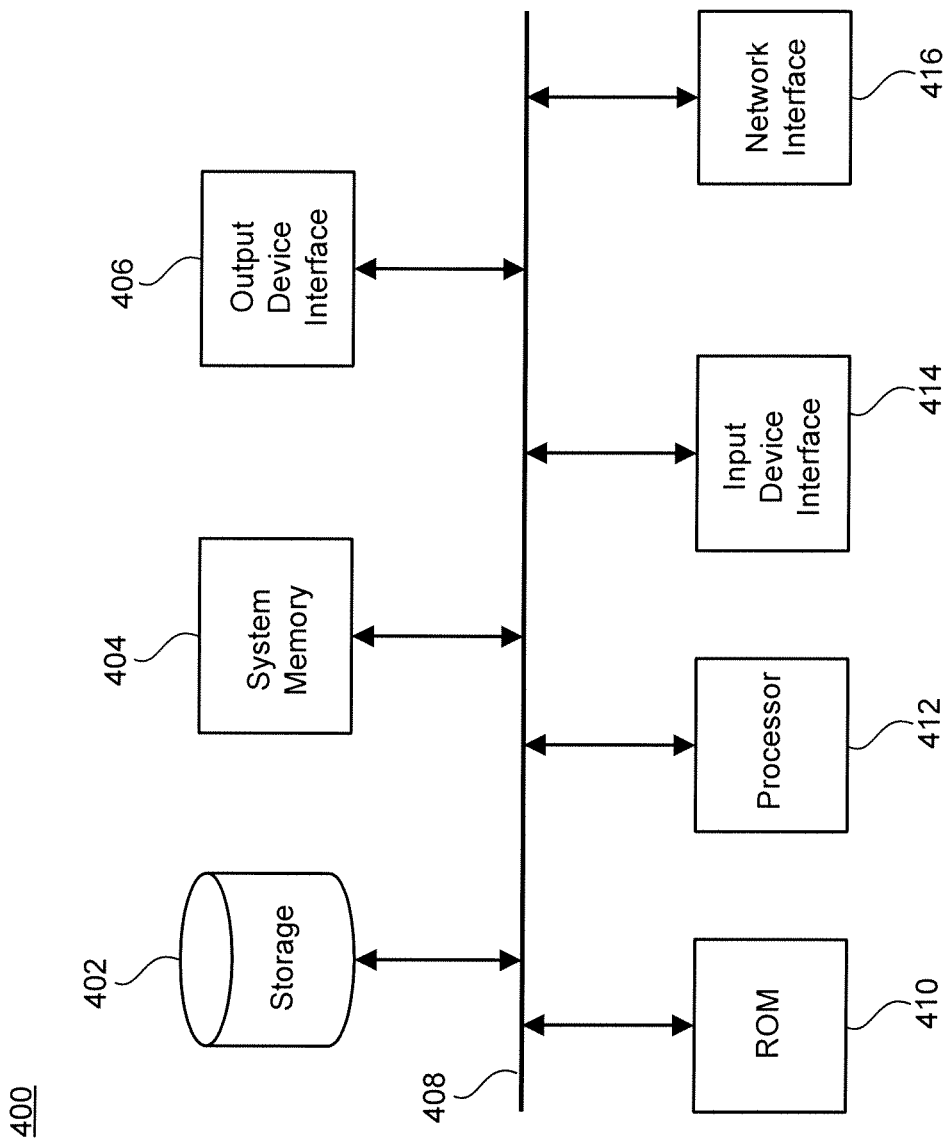
FIG. 4 conceptually illustrates an electronic system with which some implementations of the subject technology are implemented.

FIG. 4 conceptually illustrates an electronic system with which some implementations of the subject technology are implemented. In certain aspects, the computer system 400 may be implemented using hardware or a combination of software and hardware, either in an electronic device 102, 104, or integrated into another entity, or distributed across multiple entities.

Computer system 400 (e.g., electronic device 102, 104, and access point 106) includes a bus 408 or other communication mechanism for communicating information, and a processor 402 coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Example input/output modules 410 include data ports such as USB ports. The input/output module 410 is configured to connect to a communications module 412. Example communications modules 412 include networking interface cards, such as Ethernet cards and modems. In certain aspects, the input/output module 410 is configured to connect to a plurality of devices, such as an input device 414 and/or an output device 416. Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a CRT (cathode ray tube) or LCD (liquid crystal display) monitor, for displaying information to the user.

According to one aspect of the present disclosure, the electronic device 102, 104, and access point 106 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a computer device having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 400 can include electronic devices 102, and 104, and access points 106. An electronic device 102, 104 and access point 106 are generally remote from each other. The relationship of the electronic device 102, 104, and access point 106 arises by virtue of computer programs running on the respective computers and having an electronic device-electronic device or electronic device-access point relationship to each other. Computer system 400 can be, for example, and without limitation, a touchscreen device, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method comprising:
   determining, by an electronic device, a location of the electronic device;
   identifying one or more components of the electronic device configured to provide radio data communication services, wherein a first identified component is associated with a first set of one or more radio transmitters for sending radio signals related to a first radio data communication service, and wherein a second identified component is associated with a second set of one or more radio transmitters for sending radio signals related to a second radio data communication service;
   for each of the identified first identified component and the second identified component, determining, by the electronic device, whether the first radio data communication service provided by the first component is an authorized service at the determined location of the electronic device, and whether the second radio data communication service provided by the second component is an authorized service at the determined location of the electronic device;
   responsive to determining that the first radio data communication service is not an authorized service, and that the second radio data communication service is an authorized service, disabling at least one of the radio transmitters of the first set of one or more radio transmitters associated with the first identified component, and enabling at least one of the second transmitters of the second set of one or more radio transmitters associated with the second identified component.

2. The method of claim 1, further comprising:
   receiving an indication for the electronic device to operate in a limited radio mode,
   wherein the determining whether the respective data communication service provided by the component is an authorized service is performed responsive to receiving the indication.

3. The method of claim 2, wherein the indication for the electronic device to operate in the limited radio mode is generated by a user interaction with a user selectable control that is configured to trigger the electronic device to operate in the limited radio mode.

4. The method of claim 1, wherein the location is determined based on signals transmitted from a satellite navigation system.

5. The method of claim 1, wherein determining whether the respective radio data communication service provided by the component is an authorized service comprises:
   receiving a service set identifier from an active access point associated with the respective radio data communication service; and
   determining whether the received service set identifier matches any of a set of authorized service set identifiers.

6. The method of claim 1, wherein determining whether the respective radio data communication service provided by the component is an authorized service comprises:
   receiving a media access control address from an active access point associated with the respective radio data communication service; and
   determining whether the received media access control address matches any of a set of authorized media access control addresses.

7. The method of claim 1, wherein determining whether the respective radio data communication service provided by the component is an authorized service comprises:
   receiving regulatory domain settings from an active access point associated with the respective radio data communication service; and
   determining whether the regulatory domain settings do not prohibit the radio data communication service.

8. The method of claim 7, wherein the regulatory domain settings are designated by a governing agency.

9. The method of claim 1, wherein one of the radio data communication services is WIFI or another wireless local area network service.

10. The method of claim 1, wherein one of the radio data communication services is mobile broadband.

11. The method of claim 1, further comprising:
    providing, for display at the electronic device, a listing of authorized radio data communication services and one or more user selectable controls configured to disable one or more radio transmitters associated with the one or more components enabled to provide the authorized radio data communication services.

12. The method of claim 1, wherein the determining whether the respective radio data communication service provided by the component is an authorized service is based on the location of the electronic device being within a proximity of a public transportation vehicle.

13. A system comprising:
    one or more processors, and a non-transitory machine-readable storage medium comprising instructions stored therein, which when executed by the processors, cause the processors to perform operations comprising:
    receiving, by the processors, an indication for an electronic device to operate in a limited radio mode;
    identifying one or more components of the electronic device configured to provide radio data communication services, wherein a first identified component is associated with a first set of one or more radio transmitters for sending radio signals related to a first radio data communication service, and wherein a second identified component is associated with a second set of one or more radio transmitters for sending radio signals related to a second radio data communication service;
    responsive to receiving the indication, for the first identified component and for the second identified component:
    determining, by the processors, whether the first radio data communication service provided by the first component is an authorized service at a location of the electronic device, and whether the second radio data communication service provided by the second component is an authorized service at the location of the electronic device; and
    responsive to determining that the first radio data communication service is not an authorized service, and that the second radio data communication service is an authorized service, disabling at least one of the radio transmitters of the first set of one or more radio transmitters associated with the first identified component, and enabling at least one of the second transmitters of the second set of one or more radio transmitters associated with the second identified component.

14. The system of claim 13, the non-transitory machine-readable storage medium comprising instructions stored therein, which when executed by the processors, cause the processors to perform operations further comprising:
    receiving a service set identifier from the active access point; and
    comparing the received service set identifier against a set of authorized service set identifiers, wherein the radio data communication service is determined to be authorized if the received service set identifier matches one of the set of authorized service set identifiers.

15. The system of claim 13, the non-transitory machine-readable storage medium comprising instructions stored therein, which when executed by the processors, cause the processors to perform operations further comprising:
receiving a media access control address from the active access point; and
comparing the received media access control point against a set of authorized media access control addresses,
wherein the radio data communication is determined to be authorized if the received media access control address matches one of the set of authorized media access control addresses.

16. The system of claim 13, the non-transitory machine-readable storage medium comprising instructions stored therein, which when executed by the processors, cause the processors to perform operations further comprising:
receiving regulatory domain settings from the active access point; and
determining whether the regulatory domain settings prohibit the radio data communication service,
wherein the radio data communication is determined to be authorized if the radio data communication service is not prohibited by the regulatory domain settings.

17. The system of claim 13, wherein, for the second identified component: the component is already enabled to receive radio signals before selectively enabling the component, and selectively enabling the component comprises enabling the component to transmit radio signals.

18. The system of claim 13, wherein the indication to operate in the limited radio mode is received responsive to determining the electronic device is operating at a location that requires limited radio mode.

19. The system of claim 13, the non-transitory machine-readable storage medium comprising instructions stored therein, which when executed by the processors, cause the processors to perform operations further comprising:
scanning for an identifier for a known in-flight service provider; and
responsive to obtaining the identifier for the known in-flight service provider, receiving the indication to operate in the limited radio mode.

20. A non-transitory machine-readable storage medium comprising instructions stored therein, which when executed by a processor, cause the processor to perform operations comprising:
receiving, by the processor, an indication for an electronic device to operate in a limited radio mode;
identifying one or more components of the electronic device configured to provide radio data communication services, wherein a first identified component is associated with a first set of one or more radio transmitters for sending radio signals related to a first radio data communication service, and wherein a second identified component is associated with a second set of one or more radio transmitters for sending radio signals related to a second radio data communication service;
for each of the first identified component and the second identified component:
determining, by the processor, whether the first radio data communication service provided by the first component is an authorized service at a location of the electronic device, and whether the second radio data communication service provided by the second component is an authorized service at the location of the electronic device; and
responsive to determining that the first radio data communication service is not an authorized service, and that the second radio data communication service is an authorized service, disabling at least one of the radio transmitters of the first set of one or more radio transmitters associated with the first identified component, and enabling at least one of the second transmitters of the second set of one or more radio transmitters associated with the second identified component.

21. The non-transitory machine-readable storage medium of claim 20, further comprising instructions stored therein, which when executed by a processor, cause the processor to perform operations comprising:
receiving a service set identifier from the active access point; and
comparing the received service set identifier against a set of authorized service set identifiers,
wherein the radio data communication service is determined to be authorized responsive to determining the received service set identifier matches one of the set of authorized service set identifiers.

22. The non-transitory machine-readable storage medium of claim 21, wherein the received service set identifier is not determined to match the one of the set of authorized service set identifiers, and further comprising instructions stored therein, which when executed by a processor, cause the processor to perform operations comprising:
receiving a media access control address from the active access point; and
comparing the received media access control point against a set of authorized media access control addresses;
wherein the radio data communication is determined to be authorized responsive to determining the received media access control address matches one of the set of authorized media access control addresses.

23. The non-transitory machine-readable storage medium of claim 22, wherein the received media access control address is not determined to match the one of the set of authorized media access control addresses, and further comprising instructions stored therein, which when executed by a processor, cause the processor to perform operations comprising:
receiving regulatory domain settings from the active access point; and
wherein the radio data communication is determined to be authorized responsive to determining the radio data communication service is not prohibited by the regulatory domain settings.

* * * * *